(12) United States Patent
Juan et al.

(10) Patent No.: US 8,213,183 B2
(45) Date of Patent: Jul. 3, 2012

(54) ELECTRONIC DEVICE

(75) Inventors: Chun-Lung Juan, Taipei (TW);
Kuo-Cheng Chu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 253 days.

(21) Appl. No.: 12/768,733

(22) Filed: Apr. 28, 2010

(65) Prior Publication Data

US 2010/0277879 A1    Nov. 4, 2010

Related U.S. Application Data

(60) Provisional application No. 61/173,602, filed on Apr. 29, 2009.

(51) Int. Cl.
*H05K 9/00* (2006.01)

(52) U.S. Cl. ........ 361/753; 361/799; 361/818; 361/800; 361/816; 174/350; 174/377; 333/12

(58) Field of Classification Search ................. 361/753, 361/799, 800, 816, 818; 174/32, 33, 34, 174/36, 350, 377; 333/12; 343/700 MS
See application file for complete search history.

(56) References Cited

U.S. PATENT DOCUMENTS

| | | | |
|---|---|---|---|
| 4,658,334 A * | 4/1987 | McSparran et al. .......... 361/800 |
| 4,958,255 A | 9/1990 | Pritchard | |
| 5,287,008 A * | 2/1994 | Pahr ................................ 307/91 |
| 5,418,329 A * | 5/1995 | Katoh et al. ................... 174/541 |
| 5,436,405 A * | 7/1995 | Hogge et al. .................. 174/376 |
| 5,500,789 A * | 3/1996 | Miller et al. .................. 361/816 |
| 6,573,804 B2 * | 6/2003 | Hayashi .......................... 333/32 |
| 6,885,559 B2 * | 4/2005 | Chen ............................. 361/753 |
| 6,972,967 B2 * | 12/2005 | Norte et al. .................... 361/818 |
| 7,881,065 B1 * | 2/2011 | Youn ............................. 361/753 |
| 8,023,274 B2 * | 9/2011 | Hughes et al. ................ 361/753 |
| 8,035,993 B2 * | 10/2011 | Chao et al. .................... 361/818 |
| 2007/0121308 A1 | 5/2007 | Chiang | |
| 2008/0049410 A1 * | 2/2008 | Kawaguchi et al. .......... 361/818 |
| 2008/0170378 A1 * | 7/2008 | Ou-Yang ....................... 361/799 |

* cited by examiner

*Primary Examiner* — Dameon Levi
(74) *Attorney, Agent, or Firm* — Jianq Chyun IP Office

(57) ABSTRACT

An electronic device includes a case, a board module, and an electrostatic discharging module. The case has a conductive area. The board module is disposed in the case and has a ground end. The electrostatic discharging module is disposed on the case. Besides, the electrostatic discharging module includes a first discharging element and a second discharging element. The first discharging element is electrically connected to the ground end, and the second discharging element is electrically connected to the conductive area. There exists a gap between the first discharging element and the second discharging element, so that leak current generated by the board module can be prevented from being transmitted to the case, and that an electrostatic charge can be transmitted from the case to the ground end.

10 Claims, 6 Drawing Sheets

ELECTRONIC DEVICE

CROSS-REFERENCE TO RELATED APPLICATION

This application claims the priority benefit of U.S. provisional application Ser. No. 61/173,602, filed on Apr. 29, 2009. The entirety of the above-mentioned patent application is hereby incorporated by reference herein and made a part of specification.

BACKGROUND OF INVENTION

1. Field of Invention

The invention relates to an electronic device. More particularly, the invention relates to an electronic device capable of preventing electrostatic discharge (ESD) and current leakage.

2. Description of Related Art

Currently, a problem of how to avoid electrostatic discharge (ESD) in an electronic device is a key concern in terms of product safety. To protect electronic elements in the electronic device from malfunctioning because of ESD, a diode is installed between two different ground ends of the electronic device according to the related art, as exemplarily disclosed in U.S. Pat. No. 4,958,255.

Besides, when a user operates an electronic device, electrostatic charges from the human body enter a case along a seam on the case. The sudden release of charges into the device can result in destruction of the device. To resolve said issue, it was proposed to dispose a conductive element between the case and the electronic device according to the related art, and the conductive element is electrically connected to a ground end, so as to conduct the electrostatic charges to the ground end and keep the electronic elements in the case away from being destroyed by ESD, as exemplarily disclosed in US patent application publication no. 2007/0121308.

Although the issue of preventing internal electronic elements from being damaged by outside-in ESD has been addressed in the related art, leak current generated by a board module within the case during operation of the electronic device has not yet been taken into account, and said leak current flowing to the case of the electronic device is likely to result in electric shock to the user.

SUMMARY OF INVENTION

The invention is directed to an electronic device with improved reliability and safety.

In an embodiment of the invention, an electronic device including a case, a board module, and an electrostatic discharging module is provided. The case has a conductive area. The board module is disposed in the case and has a ground end. The electrostatic discharging module includes a first discharging element and a second discharging element. The first discharging element is electrically connected to the ground end, and the second discharging element is electrically connected to the conductive area. There exists a gap between the first discharging element and the second discharging element, such that leak current generated by the board module can be prevented from being transmitted to the case, and that the electrostatic charges can be transmitted from the case to the ground end.

As described in the above embodiments of the invention, the electrostatic discharging module is electrically connected not only to the conductive area of the case but also to the ground end of the board module. In addition, the gap existing between the first discharging element and the second discharging element gives rise to broken circuits. Thereby, external electrostatic charges are conducted to the ground end of the board module due to a point discharge effect at the electrostatic discharging module, such that the electronic elements in the board module are not destroyed by ESD. Moreover, with the electrostatic discharging module, the leak current generated by the board module is blocked by the gap between the discharging elements, and therefore the leak current flowing to the case of the electronic device is unlikely to result in electric shock to a user.

It is to be understood that both the foregoing general descriptions and the detailed embodiments are exemplary and are, together with the accompanying drawings, intended to provide further explanation of technical features and advantages of the invention.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
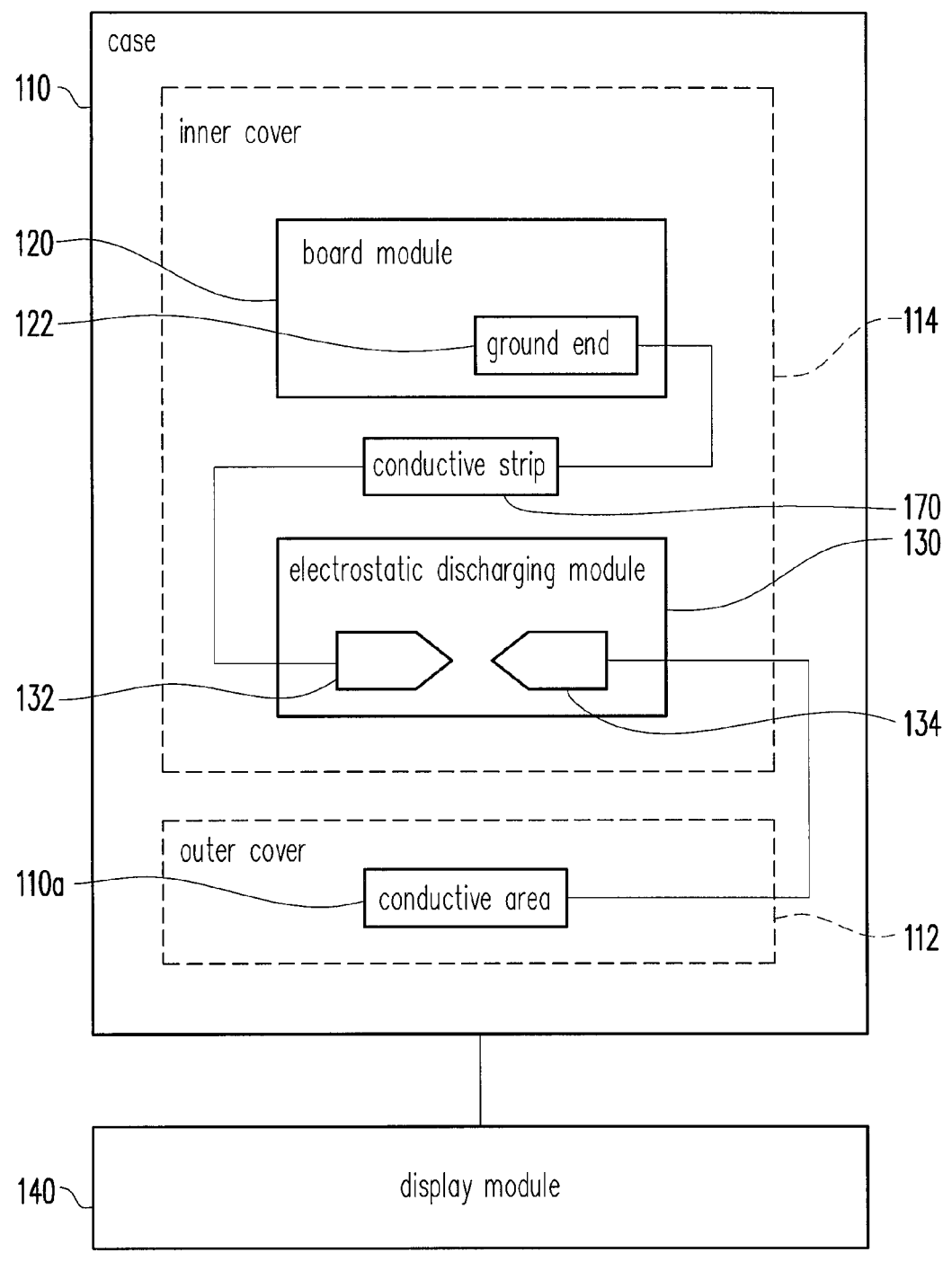
FIG. 1 is a block diagram illustrating an electronic device according to an embodiment of the invention.

FIG. 1 is a block diagram illustrating an electronic device according to an embodiment of the invention. With reference to FIG. 1, in this embodiment, the electronic device 100 is a notebook computer, for example, which should not be construed as limited to what is described herein. The electronic device 100 includes a case 110, a board module 120, an electrostatic discharging module 130, and a display module 140. The display module 140 is connected to the case 110 and can be rotated relative to the case 110.

The case 110 has a conductive area 110a located on an inner surface of the case 110. The conductive area 110a can be directly formed by the case 110 made of metallic materials or can be formed by a metal coating layer on the inner surface of the case 110. The board module 120 is disposed in the case 110 and has a ground end 122. The board module 120 can be a main board, which should not be construed as a limitation to this invention. The electrostatic discharging module 130 is disposed on the case 110 and includes a first discharging element 132 and a second discharging element 134. The first discharging element 132 is electrically connected to the ground end 122, and the second discharging element 134 is electrically connected to the conductive area 110a on the case 110.

Figure 2:
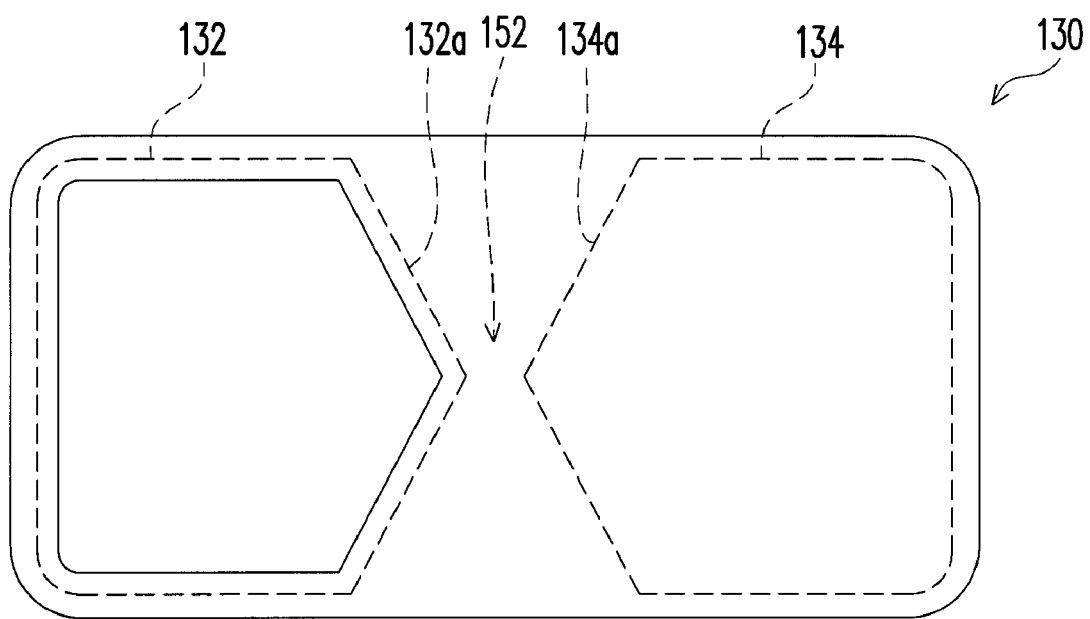
FIG. 2 is a top view illustrating the electrostatic discharging module depicted in FIG. 1.

FIG. 2 is a top view illustrating the electrostatic discharging module depicted in FIG. 1. In FIG. 2, circuit patterns on only one side of the electrostatic discharging module 130 are shown. As indicated in FIG. 2, a gap 152 exists between the first discharging element 132 and the second discharging element 134, and a width of the gap 152 is the shortest distance between the first discharging element 132 and the second discharging element 134.

Based on the above, by the arrangement of the first and the second discharging elements 132 and 134 of the electrostatic discharging module 130 in the electronic device 100, the electrostatic charges on the case 110 are conducted to the second discharging element 134 through the conductive area 110a and then conducted to the ground end 122 of the board module 120 through the first discharging element 132 due to the point discharge effect achieved by the first and the second discharging elements 132 and 134. Thereby, the electronic elements in the board module 120 are not destroyed by ESD. In addition, the gap 152 existing between the first discharging element 132 and the second discharging element 134 gives rise to broken circuits, and therefore leak current generated by the board module 120 is blocked by the gap 152, so as to prevent the leak current from being transmitted to the case 110 and protect a user from getting an electric shock. Namely, the electrostatic discharging module 130 simultaneously achieves prevention of ESD and current leakage.

Figure 3:
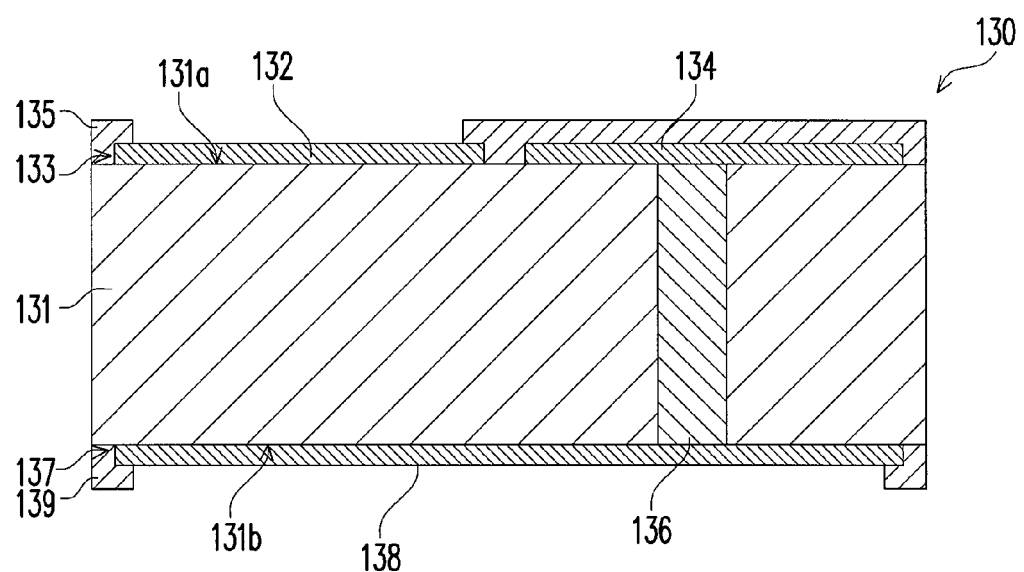
FIG. 3 is a cross-sectional view illustrating the electrostatic discharging module depicted in FIG. 1.
Figure 4:
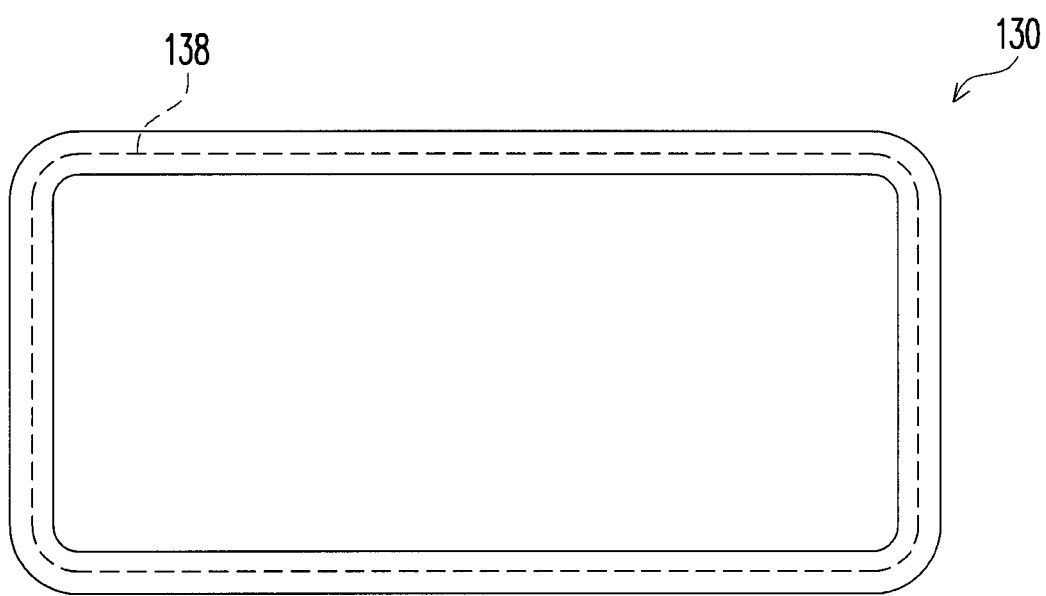
FIG. 4 is a bottom view illustrating the electrostatic discharging module depicted in FIG. 1.

FIG. 3 is a cross-sectional view illustrating the electrostatic discharging module depicted in FIG. 1. FIG. 4 is a bottom view illustrating the electrostatic discharging module depicted in FIG. 1. In FIG. 4, circuit patterns on the other side of the electrostatic discharging module 130 are shown. With reference to FIG. 2 to FIG. 4, the electrostatic discharging module 130 further includes a dielectric core board 131, a first patterned conductive layer 133, a first dielectric layer 135, a second patterned conductive layer 137, and a second dielectric layer 139. The dielectric core board 131 has a first side 131a, a second side 131b, and a conductive via 136 connecting the first side 131a and the second side 131b.

The first patterned conductive layer 133 is disposed on the first surface 131a and forms the first discharging element 132 and the second discharging element 134. The first dielectric layer 135 covers the first patterned conductive layer 133 and exposes the first discharging element 132, such that the first discharging element 132 is electrically connected to the ground end 122 (depicted in FIG. 1) of the board module 120 (depicted in FIG. 1).

The second patterned conductive layer 137 is disposed on the second side 131b of the dielectric core board 131 and forms a contact electrode 138. One side of the contact electrode 138 is electrically connected to the second discharging element 134 through the conductive via 136. The second dielectric layer 139 covers the second patterned conductive layer 137 and exposes the contact electrode 138, such that the other side of the contact electrode 138 is electrically connected to the conductive area 110a (depicted in FIG. 1) on the case 110 (depicted in FIG. 1).

Figure 5:
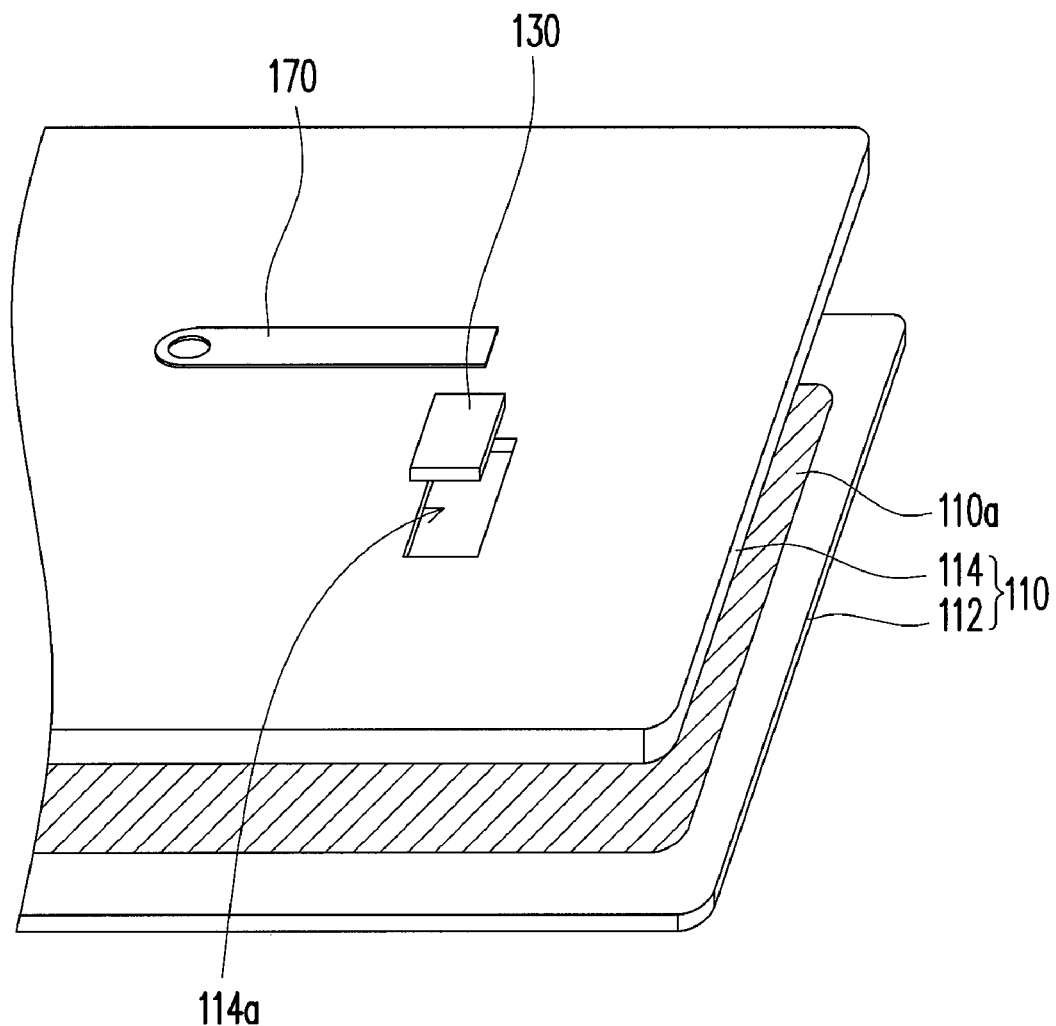
FIG. 5 is an exploded view illustrating some components in the electronic device depicted in FIG. 1.

FIG. 5 is an exploded view illustrating some components in the electronic device depicted in FIG. 1. As shown in FIG. 5, in this embodiment, the case 110 includes an outer cover 112 and an inner cover 114. The outer cover 112 has the conductive area 110a for conducting the electrostatic charges on the outer cover 112 to the electrostatic discharging module 130. The inner cover 114 is assembled to the outer cover 112. The electrostatic discharging module 130 is inlaid into an opening 114a of the inner cover 114 according to an embodiment, which should not be construed as a limitation to this invention. In another embodiment not shown, the case 110 can be a one-body case that neither has the inner cover nor has the outer cover. In the event that the case is the one-body case, the electrostatic discharging module is electrically connected to a conductive area on an inner surface of the case.

Please refer to FIG. 1 and FIG. 5 again. In this embodiment, the electronic device 100 further includes a conductive strip 170 connected between the ground end 122 of the board module 120 and the first discharging element 132, so as to electrically connect the electrostatic discharging module 130 inlaid into the inner cover 114 to the ground end 122 of the board module 120.

Please refer to FIG. 2 again. It should be mentioned that the first discharging element 132 and the second discharging element 134 respectively have a sharp outline for accomplishing the point discharge effect. In other words, the first discharging element 132 and the second discharging element 134 respectively have a pair of bevel edges 132a and 134a. An included angle between each pair of the bevel edges 132a and 134a is less than 180 degrees to form the sharp outline. A width of the gap 152 is the shortest distance between the sharp outlines of the first and the second discharging elements 132 and 134, and the width of the gap 152 preferably ranges from 4 mil to 400 mil.

Note that the contours of the first and the second discharging elements 132 and 134 are not limited in this invention.

Figure 6:
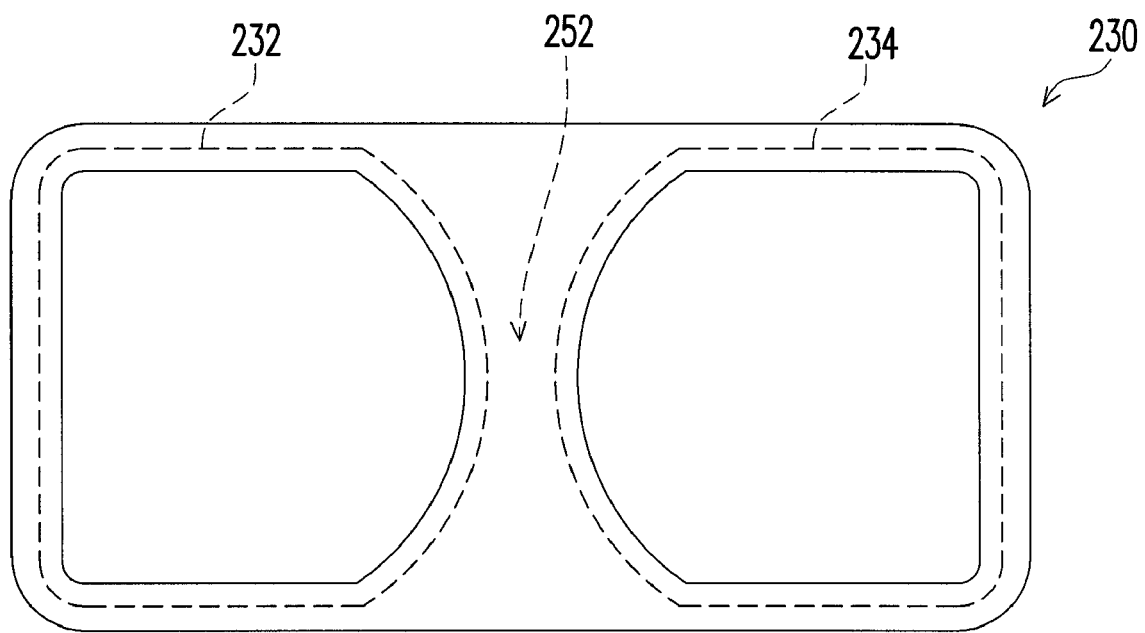
FIG. 6 is a top view illustrating an electrostatic discharging module in an electronic device according to another embodiment of the invention.

FIG. 6 is a top view illustrating an electrostatic discharging module in an electronic device according to another embodiment of the invention. In FIG. 6, the electrostatic discharging module 230 includes a first discharging element 232, a second discharging element 234, and a gap 252. The difference between the embodiment depicted in FIG. 2 and the embodiment depicted in FIG. 6 lies in that the first discharging element 232 and the second discharging element 234 respectively have an arc-shaped outline for accomplishing the point discharge effect which is also achieved in the embodiment depicted in FIG. 2. That is to say, the embodiment is applicable as long as the point discharge effect can be achieved and the gap can be formed between the discharging elements for blocking the leak current.

As described in the above embodiments of the invention, since the electrostatic discharging module has the two discharging elements electrically connected to the conductive area of the case and the ground end of the board module, respectively, the electrostatic charges on the case are conducted to the ground end of the board module due to the point discharge effect. Additionally, with the electrostatic discharging module, the leak current generated by the board module is blocked by the gap between the discharging elements and is then not conducted to the case. Hence, the electrostatic discharging module simultaneously achieves prevention of ESD and current leakage, and reliability and safety of the electronic device can be further attained.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device comprising:
   a case having a conductive area;
   a board module disposed in the case, the board module having a ground end;
   an electrostatic discharging module comprising:
     a first discharging element electrically connected to the ground end; and
     a second discharging element electrically connected to the conductive area, wherein a gap exists between the first discharging element and the second discharging element, such that a leak current generated by the board module is prevented from being transmitted to the case, and that an electrostatic charge is allowed to be transmitted from the case to the ground end.

2. The electronic device as claimed in claim 1, wherein the conductive area is located on an inner surface of the case.

3. The electronic device as claimed in claim 1, the case comprising:
   an outer cover, the conductive area being located on the outer cover; and
   an inner cover assembled to the outer cover, the electrostatic discharging module being inlaid into the inner cover.

4. The electronic device as claimed in claim 1, the electrostatic discharging module further comprising:
   a dielectric core board having a first surface, a second surface, and a conductive via connecting the first surface and the second surface;
   a first patterned conductive layer disposed on the first surface and forming the first discharging element and the second discharging element;
   a second patterned conductive layer disposed on the second surface and forming a contact electrode, the contact electrode electrically connecting the second discharging element through the conductive via and electrically connecting the conductive area;
   a first dielectric layer covering the first patterned conductive layer and exposing the first discharging element; and
   a second dielectric layer covering the second patterned conductive layer and exposing the contact electrode.

5. The electronic device as claimed in claim 1, further comprising a conductive strip electrically connected between the ground end and the first discharging element.

6. The electronic device as claimed in claim 1, wherein the first discharging element and the second discharging element respectively have a sharp outline.

7. The electronic device as claimed in claim 5, wherein the first discharging element and the second discharging element respectively have a pair of bevel edges, and an included angle between each pair of the bevel edges is less than 180 degrees to form the sharp outline.

8. The electronic device as claimed in claim 1, wherein the first discharging element and the second discharging element respectively have an arc-shaped outline.

9. The electronic device as claimed in claim 1, wherein a width of the gap is a shortest distance between the first discharging element and the second discharging element.

10. The electronic device as claimed in claim 1, wherein the width of the gap ranges from 4 mil to 400 mil.

* * * * *